United States Patent [19]

Ng et al.

[11] Patent Number: 5,812,202
[45] Date of Patent: Sep. 22, 1998

[54] METHOD AND APPARATUS PERFORMING INVERSE TELECINE FOR MPEG CODING

[75] Inventors: Johnny C. Y. Ng, Palo Alto; Keith M. Evans, San Jose; Mauro Bonomi, Palo Alto, all of Calif.

[73] Assignee: Minerva Systems, Inc., Santa Clara, Calif.

[21] Appl. No.: 410,181

[22] Filed: Mar. 24, 1995

[51] Int. Cl.⁶ ........................................... H04N 5/08
[52] U.S. Cl. ........................... 348/446; 348/97; 348/558
[58] Field of Search ..................... 348/97, 526, 446, 348/604, 558, 449, 459, 911, 441; H04N 5/08

[56] References Cited

U.S. PATENT DOCUMENTS

| | | | |
|---|---|---|---|
| 4,876,596 | 10/1989 | Faroudja | 358/140 |
| 4,967,271 | 10/1990 | Campbell et al. | 358/105 |
| 5,353,119 | 10/1994 | Dorricott et al. | 348/446 |
| 5,452,011 | 9/1995 | Martin et al. | 348/526 |

*Primary Examiner*—Tommy Pichin
*Assistant Examiner*—Luanne P. Din
*Attorney, Agent, or Firm*—Skjerven, Morrill, MacPherson, Franklin & Friel LLP; Edward C. Kwok

[57] ABSTRACT

A method and an apparatus perform an inverse telecine procedure on a video sequence to eliminate redundant information introduced by the telecine process, so as to achieve more efficient data compression. The method and apparatus maintain synchronization between audio and video portions of the video sequence by ensuring that 20% of all frames, distributed substantially uniformly over the video sequence, are deleted. One embodiment of the present invention is provided in desktop computer system.

12 Claims, 5 Drawing Sheets

METHOD AND APPARATUS PERFORMING INVERSE TELECINE FOR MPEG CODING

BACKGROUND OF THE INVENTION

1. Field of the Invention

The present invention relates to video signal processing; and, in particular the present invention relates to encoding motion pictures in a compressed format, such as the format promulgated by the Motion Picture Expert Group (MPEG).

2. Discussion of the Related Art

Conventional motion pictures are shown at 24 frames per second, while conventional video sequences are displayed at 30 frames per second. Under the NTSC standard, each frame of a video sequence is also divided into first and second fields, which are displayed successively. The first field is formed by the odd number scan lines of the video frame and the second field is formed by the even number scan lines of the video frame.

Because of the different speeds prescribed for showing a motion picture and for showing a video sequence, when a motion picture is converted to be shown as a video sequence, e.g. recorded on a video medium, such as a video tape, a conversion process, called "telecine" or "3-2 pull-down" is used. FIG. 1 illustrates conceptually the telecine process for converting between a motion picture format and a video format.

FIG. 1 shows four frames of a motion picture, labelled generally by reference signals A, B, C, and D. Each frame is digitized and separated into first and second fields, as indicated generally by reference signals A1, A2, B1, B2, C1, C2, D1 and D2. Because motion pictures are shown at 24 frames per second and a video sequence is shown at 30 frames or 60 fields a second, two fields are repeated in the video sequence for every four frames, so as to compensate for the higher picture rate in a video sequence. As shown in FIG. 1, fields B1 and D2 are repeated. FIG. 1 also shows the sequence in which the fields are to be displayed: A1, A2, B1, B2, B1, C2, C1, D2, D1 and D2. This pattern (the "telecine pattern") is repeated for every four frames of the motion picture. Thus, in the remainder of the description, to facilitate reference, this pattern is referred to by its five phases (i.e. the five frames formed by the eight original fields from the four frames of the motion picture plus the two redundant fields), labelled in FIG. 1 as phases 0, 1, 2, 3 and 4 respectively, each phase involving two fields.

The Motion Picture Experts Group promulgates a compressed video format (the "MPEG" format) for storing video sequences in digital storage media. The MPEG format minimizes the storage requirement for video sequences using data compression techniques which eliminate both interframe and intraframe redundancies. Since redundancy, namely the repeated fields, is introduced in the telecine process, it is desirable to eliminate this redundancy prior to performing data compression. Ideally, if the telecine pattern shown in FIG. 1 persists throughout the video sequence, once a starting point (e.g. phase 0) for the telecine pattern is located, reversing the telecine process can be accomplished by removing fields B1 and C2 from phase 2. This method, even though it discards information in one field (i.e. field C2), is acceptable in certain applications. Of course, if reordering of fields is available, lossless reconstruction can be achieved by eliminating field B1 from phase 2 and field D2 from phase 3, and reordering fields C1 and C2 in phases 2 and 3, respectively.

Digital computers are often used to edit video sequences. The edited video sequences are often edited without regard to maintaining the telecine pattern. Performing a reverse telecine process on such a video sequence results in unacceptable artifacts, especially in a video sequence capturing much motion. As a result, it can be a daunting task to reverse the telecine process in such an edited video sequence.

SUMMARY OF THE INVENTION

The present invention provides a method for automatically identifying redundant fields in a video sequence containing telecined film material. The present invention allows such fields to be eliminated ("inverse telecine") prior to data compression, so as to achieve a higher compression efficiency, and to avoid temporal artifacts due to the redundant fields. In addition, the present invention preserves video-audio synchronization to minimize artifact due to the inverse telecine process, especially in edited material.

In accordance with the present invention, an apparatus for performing an inverse telecine process on a video sequence is provided. The apparatus of the present invention includes: (a) a phase detector, which provides two control signals indicating, respectively, (i) that a telecine pattern is detected in the video sequence, and (ii) a phase value of a redundant field relative to a preselected position of a repeated sequence in the telecine pattern. The states of the two control signals are periodically sampled and stored in registers to be examined periodically by a central processing unit. The central processing unit is regularly interrupted to (i) examine the sampled values of the control signals, (ii) determine if a disruption in the telecine pattern of the video sequence has occurred, (iii) determine whether a shift in phase value has occurred; (iv) determine a new phase value at the point of disruption; and (v) include the video field in a encoder control list.

In one embodiment, the central processing unit further groups the video sequence into groups of consecutive fields, each group including a predetermined number of fields. The central processing unit then marks in each of the groups, a predetermined number of fields for deletion. In that embodiment, each group includes five frames; and, among the five frames, one frame (i.e. two fields) is marked from deletion. The frame marked for deletion is selected in that embodiment according to the rules:

(a) if a redundant field is detected in the group, the redundant field is marked for deletion; (b) if a phase shift is detected in the group, and no redundant field is detected in the group, the frame at which the phase shift occurs is marked for deletion; and (c) when multiple redundant fields are detected in the group, the redundant field arriving latest in time is marked deleted.

In one embodiment, a control circuit removes from the encoding process the select video fields of the video sequence marked for deletion. An encoder, receiving the video sequence after such video fields are removed from the encoding process, performs a data compression procedure on the reduced video sequence. One implementation prevents the encoder from reading the deleted fields of the video sequence by masking out the synchronization signal indicating the arrivals of the deleted frames.

The method embodiment in the apparatus discussed above is applicable to be carried out in other implementations, including but not limited to microprocessor-based computer system, or dedicated hardware solutions.

The present invention is better understood upon consideration of the detailed description below and the accompanying drawings.

BRIEF DESCRIPTION OF THE DRAWINGS AND APPENDICES

Figure 5:
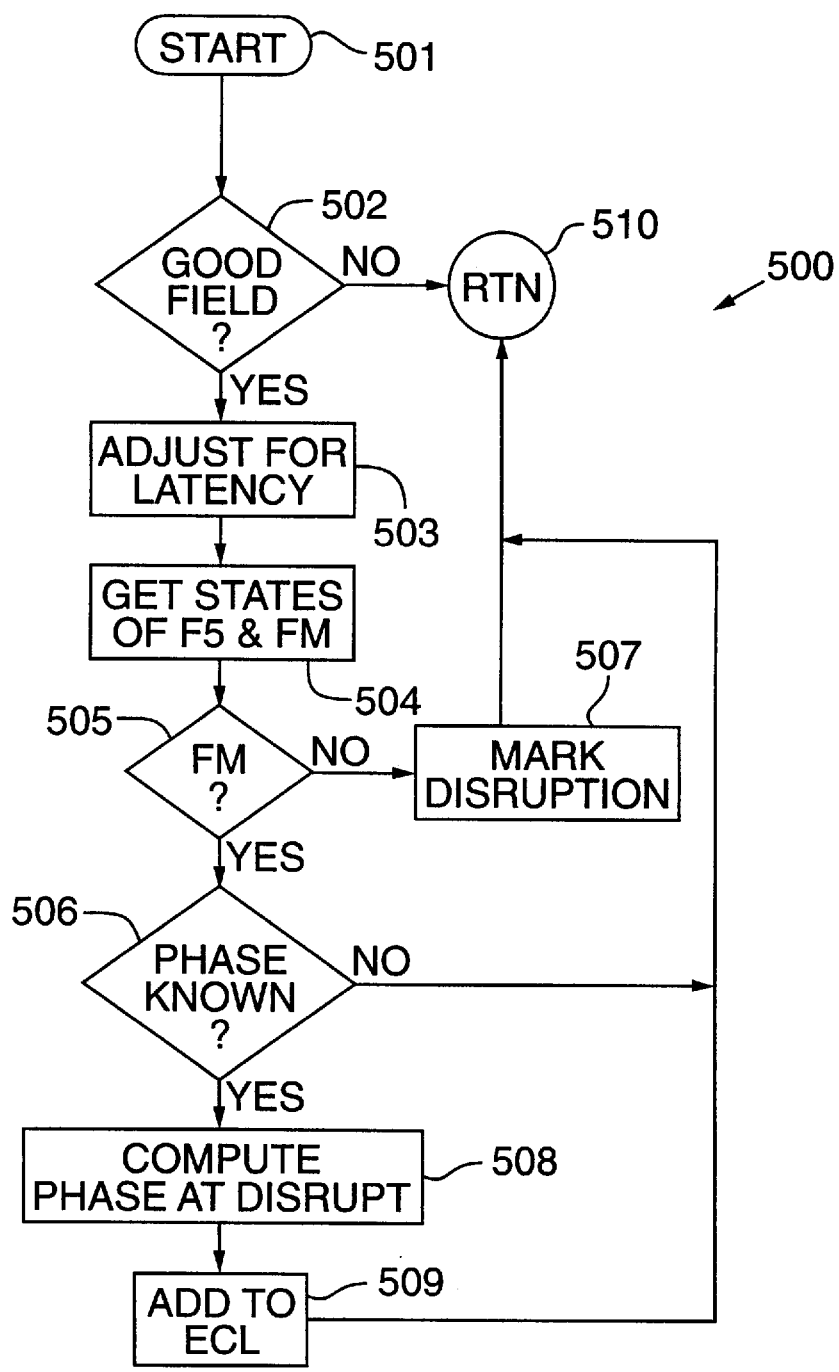

FIG. 5 summarizes an implementation of a phase detection step in a routine DoPhaseDetect( ), according to the present invention.

Figure 6:
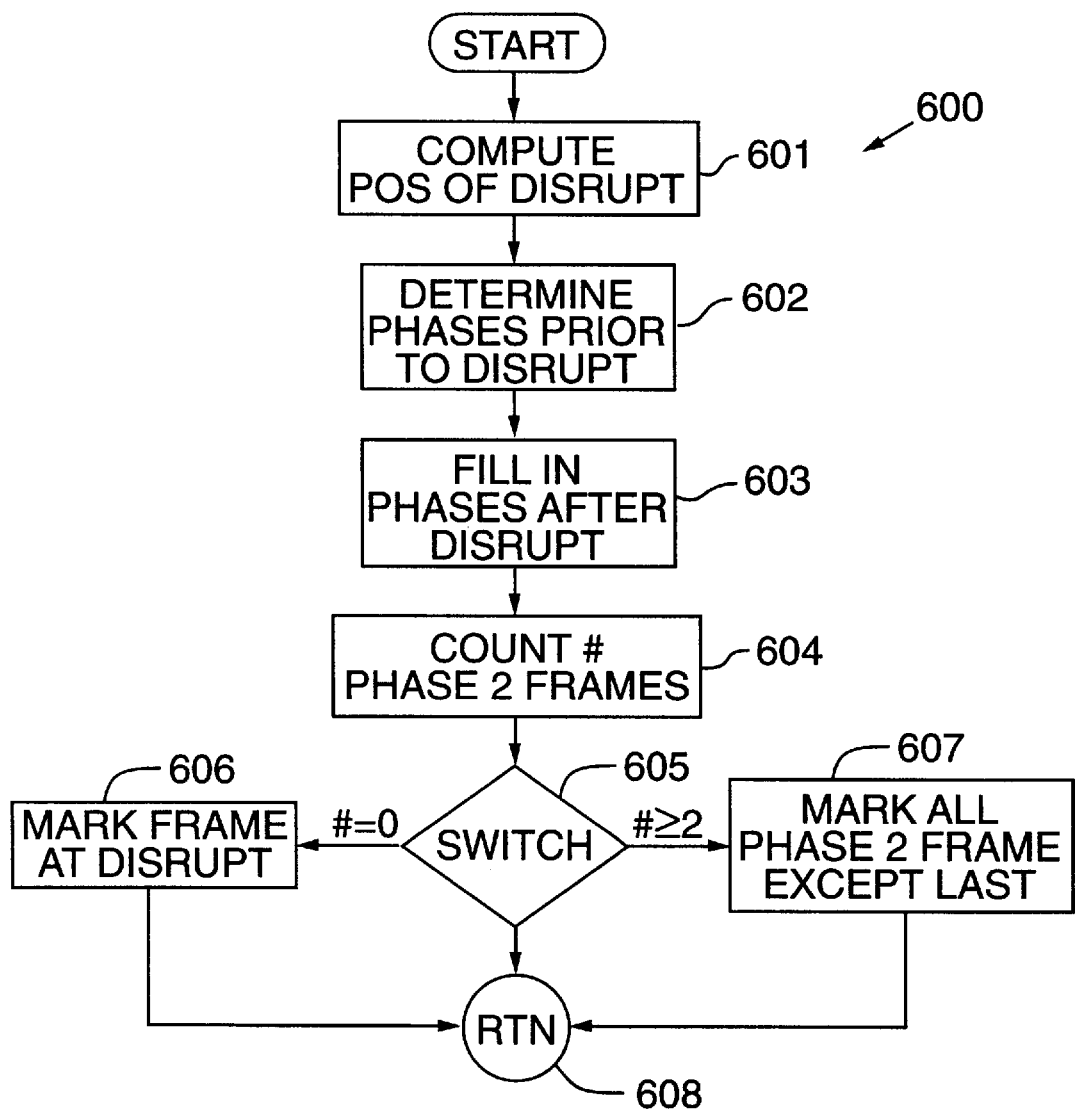

FIG. 6 summarizes an implementation of a normalization step in a routine NormalizePhaseChange( ), according to the present invention.

Appendix A is a listing including routines DoPhaseDetect( ) and NormalizePhaseChange( ), which are implementations of the phase detection step 500 of FIG. 5 and the normalization step 600 of FIG. 6, respectively.

DETAILED DESCRIPTION OF THE PREFERRED EMBODIMENTS

The present invention provides a method and an apparatus for performing a reverse telecine process on a video sequence prior to data compression. Such data compression can be performed in accordance with an industry standard, such as MPEG.

Figure 2:
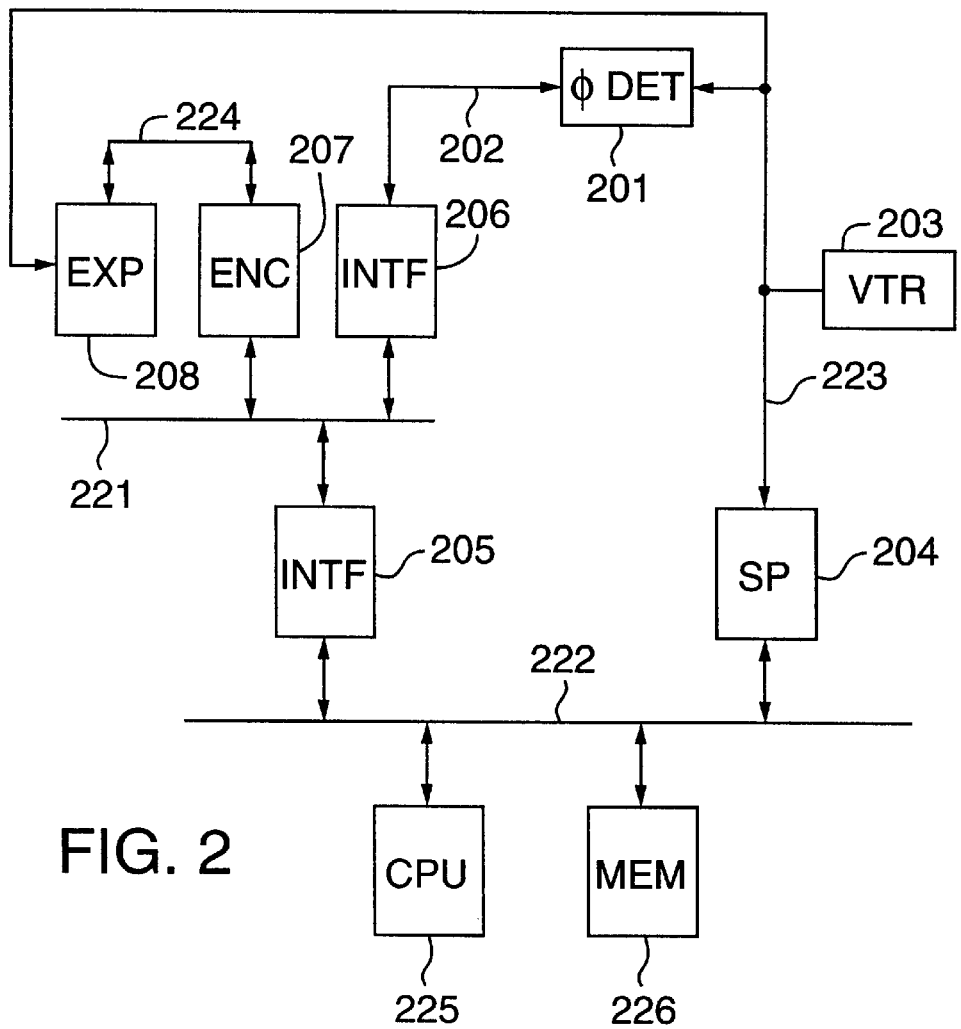
FIG. 2 is a block diagram of system 100, which is an embodiment of the present invention.

FIG. 2 is a block diagram of system 200, which is an embodiment of the present invention. In this embodiment, system 200 is based on an environment of a Macintosh computer, available from Apple Computer, Inc., Cupertino, Calif. System 200 includes a central processing unit (CPU) 225, which communicates with a memory system 226 over a CPU bus 222. On CPU bus 222 are serial interface 204 and NuBus interface 205. NuBus interface 205 couples CPU bus 222 to an industry standard peripheral bus NuBus 221. In this embodiment, a video system is coupled to NuBus 221. This video system includes a digitizer unit (digitizer 208), a video encoder unit (video encoder 207) and an interface (interface 206) to a phase detector unit (phase detector 201). Video encoder 207, which is coupled to digitizer 208 over a dedicated video bus 224, has the ability to interrupt CPU 225 by asserting an interrupt request on NuBus 221. Digitizer unit 208 can be implemented, for example, by the Explorer module which is available from Intelligent Resources, Inc., Arlington, Ill., Digitizer unit 208 receives an analog video signal from a video source, such as video tape recorder 203, to provide a digitized video data stream in the luminance-chrominance (YUV) format. Encoder 207 can be implemented by an encoder such as that described in the patent application 08/197,914 entitled "System and Method for Digital Video Publishing" by Mauro Bonomi, filed on Feb. 17, 1994, now U.S. Pat. No. 5,577,191 issued on Nov. 19, 1996, assigned to Minerva Corporation, which is also the assignee of the present application.

In FIG. 2, interface 206 is coupled to a phase detector (phase detector 201), which receives the video signal from video tape recorder 203, and detects if the fields in the video signal appear in accordance with the telecine pattern discussed above with respect to FIG. 1. Typically, a video sequence converted from a motion picture follows the telecine pattern throughout the entire sequence, containing very few departures ("disruptions") from the telecine pattern. For a motion picture-based video sequence, disruption typically occurs between reels of film. Disruptions in motion picture material is rare primarily because editing is performed prior to the telecine process. In comparison, "complex materials", such as commercial advertising or music videos, have a much larger number of disruptions per unit of time, as they are typically edited in a video medium, such as a video tape.

Phase detector 201 provides two control signals FM and F5, which are discussed in further detail below. Phase detector 201 can be implemented by the motion sequence pattern detector described in U.S. Pat. No. 4,982,280, entitled "Motion Sequence Pattern Detector for Video" to Lyon et al., filed Jul. 18, 1989 and issued Jan. 1, 1991. An implementation of such a phase detector is also available from Faroudja Laboratories, Santa Clara, Calif.

During operation, interface 206 samples the values of signals FM and F5 into interface 206's internal registers periodically, at a frequency much higher than one sixtieth of a second[1]. These internal registers of interface 206 can be polled by CPU 255 over NuBus 221. At the same time, digitizer 208 detects a vertical synchronization signal embedded in the video signal received from video tape recorder 203, as the video signal is digitized. Digitizer 208 also keeps track of whether, in conjunction with the vertical synchronization signal, the first or the second field of a frame is being received. Digitizer 208 passes to encoder 207 both the field and the vertical synchronization signal, which appears at the beginning of each field, i.e. every sixtieth of a second. In response to this information, encoder 207 interrupts CPU 225. This interrupt from encoder 207 is handled by CPU 225 polling the values of the FM and F5 signals from the aforementioned internal registers of interface 206.

[1] To be precise, standard video is provided at the rate of one field every 1/59.97 seconds.

Figure 4:
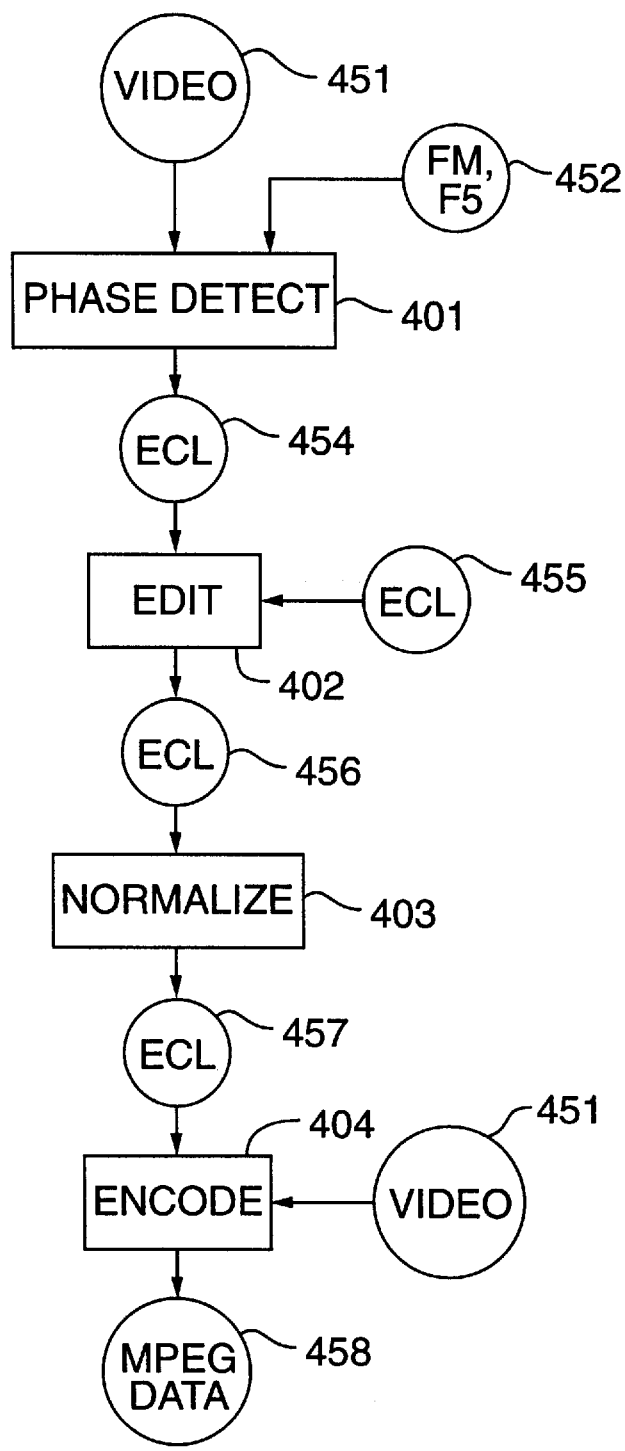
FIG. 4 is a flow diagram illustrating a method of the present invention.

The present invention is an "inverse telecine" procedure which uses the states of signals FM and F5 to mark for deletion the redundant fields resulted from a telecine step, so as to enhance video compression performance. The present invention ensures that the reduced video sequence remain synchronized to the audio portion. A method according to the present invention is illustrated in FIG. 4 in flow diagram form. As shown in FIG. 4, a phase detection step 401 receives as input data identification information of video fields in a video sequence, indicated by reference numeral 451, and the states of signals FM and F5 associated each video field, indicated by reference numerals 452. In the present embodiment, for each video field, identification information 451 includes a time code from which the video information in the field can be identified and from which the information as to whether the field is the first or the second field of a frame can also be derived.

Phase detection step 401 detects any disruption in the telecine pattern, in the manner described in further detail below, and provides an encoder control list ("ECL"), indicated by reference numeral 454, which identifies, for each disruption, the field at which the disruption occurs and the new phase entered at the disruption. Each entry in an ECL of the present embodiment includes a time code, a directive and a phase number. The time code identifies the video frame in the video sequence. The directive provides is provided to direct the operation of encoder 207 with respect to the compression operation. The directive supported in this embodiment are "PHASE CHANGE", "DROP", "KEEP", "START" and "STOP". In this embodiment, however, because both fields of a given frame, which includes the redundant field or fields, are dropped, the frame number, rather than the field number, is included in ECL 454. The present embodiment allows an optional edit step, indicated by reference numeral 402, in which both ECL 454 and any other ECLs related to the video sequence, indicated by reference numeral 455, can be manually edited and merged to provide an edited ECL 456. Manual editing introduces additional flexibility.

ECL 456 is then provided to a "normalization" step, indicated by reference numeral 403, which ensures that the inverse telecine process, i.e. marking for deletion frames including redundant fields, maintains synchronization between the video information and the audio information. Normalization step 403 achieves synchronization by ensuring that the overall deletion is 20% of the frames, and the deleted frames are substantially uniformly spaced within the video sequence. Normalization step 403 provides a revised ECL, indicated by reference numeral 457, which is used in an encoding step, indicated by reference numeral 451, for encoding video data 451 into compressed data (458) under an industry standard compressed format, such as that defined by the MPEG standard.

Figure 1:
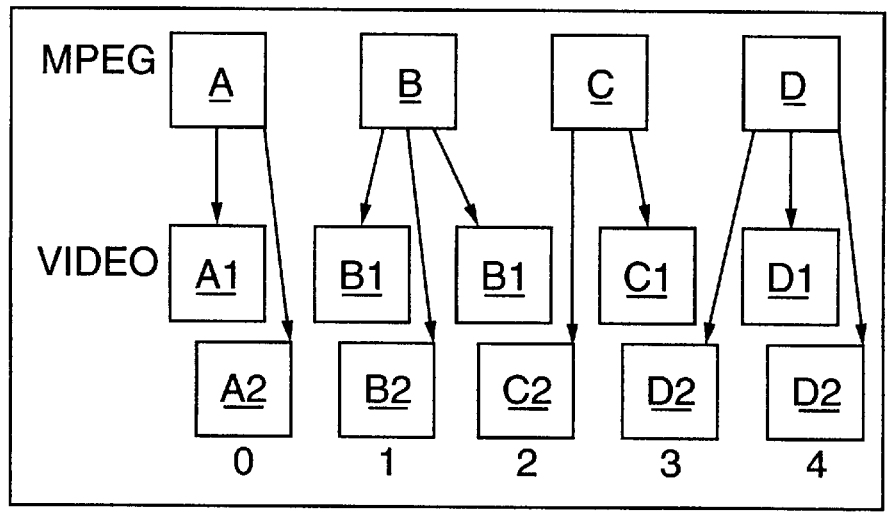
FIG. 1 illustrates conceptually the telecine process for converting between a motion picture format and a video format.
Figure 3:
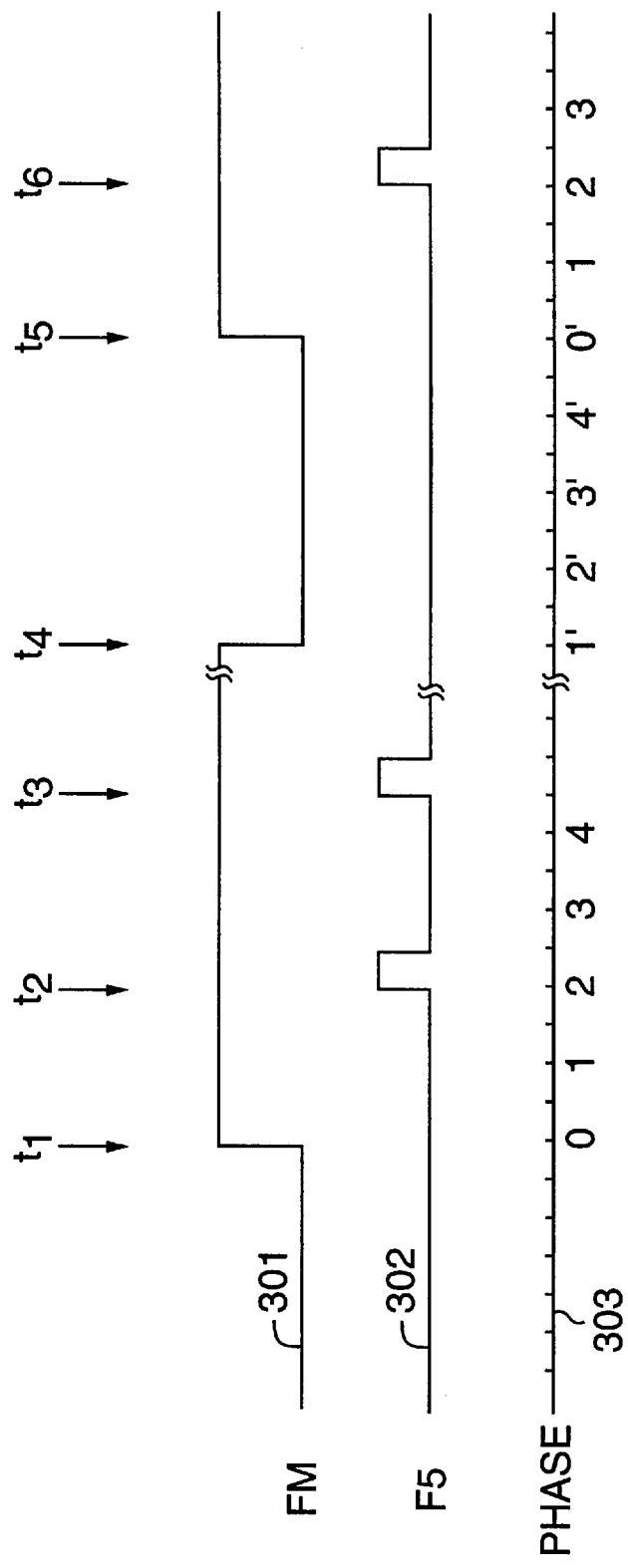
FIG. 3 illustrates using signals FM and F5 of phase detector 201 in a phase detection step of a method in accordance with the present invention.

FIG. 3 illustrates phase detection step 401 using signals FM and F5 of phase detector 201. Signal FM, which is represented by waveform 301 of FIG. 3, is asserted when the video sequence received exhibits a telecine pattern, such as that shown in FIG. 1. In this embodiment, signal FM can usually detect the telecine pattern after examining fifteen fields or so. Signal F5, which is represented by waveform 302, is asserted by phase detector 201, when signal FM is asserted, at phases 2 and 4 (FIG. 1). Phases 2 and 4 correspond to the frames at which fields B1 and D2 are duplicated, respectively. Line 303 of FIG. 3 is marked by a number of tick marks indicating arrivals of video fields. Each video field's arrival is indicated by a vertical synchronization signal. In FIG. 3, phase numbers are provided underneath line 303 to help illustrate the phase detection process.

As shown in FIG. 3, at time $t_1$, phase detector 201 detects the telecine pattern and asserts signal FM. At the arrival of the first field of phase 2 (time $t_2$), phase detector 201 asserts signal F5. Similarly, at the arrival of the second field of phase 4 (time $t_3$), signal F5 is again asserted. As discussed above, the telecine pattern are often disrupted by video editing after the telecine process. When such a disruption occurs, such as that shown in FIG. 3 at time $t_4$, signal FM is negated until phase detector 201 again detects the telecine pattern, e.g. at time $t_5$. In this embodiment, the phase at the disruption is provided by, assuming that no additional disruptions occurred during the period during which signal FM is negated, retracing the telecine pattern backwards in time back to the time of the disruption. For example, as signal F5 is once again asserted at time $t_6$, at the arrival of the first field in a frame, time $t_6$ therefore marks the arrival of a phase 2 frame. Tracing backwards in time back to time $t_4$, assuming no interim disruption, the phase at time $t_4$ is found to be phase 1 (labelled in FIG. 3 as phase 1'). In this embodiment, on rare occasions, the traced back phase is the same as the phase which would have been if no disruption has occurred. In that situation, no disruption is deemed to have occurred.

An implementation of phase detection step 401 is provided in the present embodiment as a routine "DoPhaseDetect( )" which is executed by CPU 225 whenever encoder 207 interrupts CPU 255 at each field of the video sequence. A listing of routine DoPhaseDetect( ) is provided as Appendix A. FIG. 5 summarizes in flow chart 500 the various steps in routine DophaseDetect( ). As shown in FIG. 5, when routine DoPhaseDetect( ) is invoked (step 501), the identification of the current video field (i.e. the current time code) is examined, at step 502, to determine if video field is within the video sequence in which inverse telecine is to be performed. If the video field is out of range, routine DoPhaseDetect( ) returns (step 510). Otherwise, the current time code is synchronized to the current states of signals FM and F5, in step 503, by associating the current states of signals FM and F5 with their corresponding video fields, giving effect to the latency in phase detector 201. Then, in step 504, the current states of signals FM and F5 are read from the internal registers of interface 206.

At step 505, the current state of signal FM is determined. If signal FM is currently negated (i.e. a "video" state) and signal FM, as last examined, is asserted (i.e. a "film" state), a disruption is deemed detected. The start time of the disruption is then noted at step 507 and routine DoPhaseDetect( ) returns. Otherwise, if both the current and last states are video states, routine DoPhaseDetect( ) returns. Alternatively, if signal FM is asserted, then the current state of signal F5 is examined in step 506. Since signal F5 is asserted at either phase 2 or phase 4, a negated state of signal F5, while signal FM is asserted, does not provide sufficient information to determine the current phase. Routine DoPhaseDetect( ) returns if the current phase is unknown. However, if the current phase is either 2 or 4, routine DoPhaseDetect( ) then traces back to the time of disruption, in the manner described above, to compute at step 508 the phase of the video field at the last disruption. At step 509, the time of the disruption and its associated phase are entered into ECL 454 as a phase change. Routine DoPhaseDetect( ) then returns. Steps 505 and 506 are accomplished, in the present embodiment, by the routine GetActualPhase, which is also listed in Appendix A.

In the present embodiment, since ECL 454 is provided as ASCII text, edit step 402 of FIG. 4 can be accomplished by any text editor. As discussed above, the goal of normalization step 403 of FIG. 4 is to ensure that the video and the audio portions of the video sequence remain synchronized after the inverse telecine process. One way to achieve this goal is to distribute the fields marked for deletion substantially uniformly throughout the video sequence. In the present embodiment, uniformity is achieved by dividing the video sequence into groups of five frames (i.e. 10 fields in each group) and requiring one frame (i.e. two fields) to be marked for deletion in each group. The deletion rules in the present embodiment are provided as follows:

In each group of five frames:
1. If no disruption is detected within the group, i.e. the telecine pattern is presumed maintained within the group, or if a disruption is detected, but only one phase 2 frame is included in the group, the phase 2 frame is marked for deletion by default;
2. If a disruption is detected within the group, and as a result, no phase 2 frame is found in the group, the frame at which the disruption occurs is marked for deletion; and
3. If a disruption is detected within the group, and as a result, more than one phase 2 frame is in the group, the phase 2 frame latest in time is marked for deletion.

Rule 1 above, which marks for deletion the frame at the disruption, when no phase 2 frame is in a group of five frames, minimizes noticeable artifacts when the video sequence is later viewed. This is because the disruption typically occurs at a scene change, sometimes resulting from splicing together two independently created video sequences. Of course, marking for deletion the frame at the disruption is a design choice. An equally valid choice is marking for deletion the frame immediately preceding the disruption. Rule 3, which keeps all redundant frames in a group of five frames except the last frame, also exercise a design choice. Clearly, deleting any one of the redundant frames is an equally valid design choice.

An implementation of normalization step 403 is provided in the present embodiment in a routine NormalizePhaseChange( ), which is also listed in Appendix A. Routine NormalizePhaseChange( ) is summarized in FIG. 6. In the present embodiment, during encoding, CPU 225 masks out the vertical synchronization signals for phase 2 frames received at encoder 207, so that phase 2 frames are dropped from encoding in encoder 207. This feature limits ECL 457 to a manageable size. To retain a phase 2 frame, an entry is made in ECL 457 specifically directing that the phase 2 frame be kept (i.e. an ECL entry with the directive "KEPT"). Thus, routine NormalizePhaseChange( ) needs only consider the frames located immediately before and after a disruption.

As shown in FIG. 6, at step 601, routine NormalizePhaseChange( ) first computes, for each disruption, the position (modulo 5) of the disruption, relative to the beginning of the video sequence. This position represents also the position of disruption in a group of five frames. At step 602, the phases of the frames prior to the disruption within the group of five frames are computed using the phase entered at the last disruption. At step 603, the phases at and subsequent to the disruption are determined from ECL 456. The number of phase 2 frames within the group of five frames are then tallied at step 604. If there is no phase 2 frame in the group of five frames, the frame at the disruption is marked deleted at step 606, by entering into ECL 457 an entry identifying the frame and marking the directive field of the entry "DROP". If there is only one phase 2 frame within the group of five frames, nothing needs to be done, since CPU 225 will automatically withhold the phase 2 frame from encoder 207 by masking out the vertical synchronization signals of both fields in the phase 2 frame. otherwise, if there are more than two phase 2 frames in the group of five frames, all phase 2 frames, except the one latest in time, are marked "KEEP". The phase 2 frames to be kept and all frames of other phases marked "DROP" are compiled into ECL 457, as shown in FIG. 4. Drop list 457 is then used by CPU 225 to restore at encoder 207 synchronization signals for phase 2 frames marked kept, and to mask out at encoder 207 the synchronization signals for additional frames marked deleted. Encoder 207 then encodes the reduced video sequence in accordance to the format prescribed under the MPEG format.

The above detailed description is provided to illustrate the specific embodiments of the present invention and is not intended to limit the present invention. Numerous variations and modifications are possible within the scope of the present invention. For example, other phase detection techniques, other than those disclosed in the Lyon '280 patent discussed above, can be used to provide the information necessary to decode the phase information whenever the telecine pattern is encountered. As another example, although the present embodiment discard both fields of a frame marked for deletion, the present invention can also be carried out by examining all the fields in a normalization group and select two fields, whether or not belonging to the same frame to be discarded. The present invention is defined by the following claims.

APPENDIX A, p. 1 of 9

This document is divided into four sections:
    SECTION 1: HIGH-LEVEL DESCRIPTION
    SECTION 2: STEP B: REDUNDANCY SIGNAL -> PHASE CHANGE LIST
    SECTION 3: STEP D: PHASE CHANGE LIST -> SYNCED PHASE CHANGE LIST
    SECTION 4: UTILITY ROUTINES APPENDIX A, p. 2 of 9

SECTION 1: HIGH-LEVEL DESCRIPTION

OVERALL FLOW

```
     StepB()                  StepD()
       |                         |
   DoPhaseDetect()       NormalizePhaseChange()
       |                         |
   GetActualPhase()         InsertAction()
```

DATA STRUCTURES AND GLOBAL VARIABLES

```
typedef struct phasechange
{
    timecode    time;
    char        phase;      // this can have any of the PHASE values #defined below
} phasechange;

define PHASECHANGEMAX 400 define PHASE_KEEP -4
define PHASE_DROP -3
#define PHASE_UNKNOWN -2
define PHASE_VIDEO -1 define ACTION_KEEP -4
define ACTION_DROP -3
define ACTION_NONE 0 phasechange gPhaseChange[PHASECHANGEMAX];   // an array of phase changes or actions
```

SECTION 2: STEP B: REDUNDANCY SIGNAL -> PHASE CHANGE LIST

```
/*

StepB()
{
    DoPhaseDetect();
}

*/

/*
Routine:    DoPhaseDetect()
Purpose:    construct a list of phase changes
Execution:  called once every video field
Inputs:
Outputs:
Description:
*/ void DoPhaseDetect( void )
{
    static timecode fChangeTimecode;
    static Boolean bJustDetectedVideo = false;
    static Boolean bDetecting = false;

char curPhase,oldPhase;
    char FM,F5;
    timecode fCurTimecode,nowTimecode;
    ulong fCurrentFieldCount;
    short p;

// figure out if we're between In- and Out-points nowTimecode = sVTR_POLL();

if(*(ulong *)&nowTimecode == *(ulong *)&inTimecode)
    {
        bDetecting = true;
        p = 0;
        *(ulong *)&fChangeTimecode = *(ulong *)&nowTimecode;
    }
    if(*(ulong *)&nowTimecode == *(ulong *)&outTimecode)
    {
        bDetecting = false;
        gPhaseChange[p].phase = PHASE_UNKNOWN; // to end the Phase Change List
    } if(!bDetecting )        // not yet past in-point, or reached out-point
        return;
```

APPENDIX A, p.4 of 9

```c
// adjust for telecine detection latency fCurrentFieldCount = gCurrentFieldCount + gDetectionFieldLatency;
*(ulong *)&fCurTimecode = *(ulong *)&nowTimecode;
if(gDetectionFieldLatency>=0)
{
    if(gCurrentFieldCount & 1)
        add_frames( &fCurTimecode, (gDetectionFieldLatency>>1) + 1 );
    else
        add_frames( &fCurTimecode, (gDetectionFieldLatency>>1) );
}
else
{
    if(gCurrentFieldCount & 1)
        sub_frames( &fCurTimecode, (gDetectionFieldLatency>>1) );
    else
        sub_frames( &fCurTimecode, (gDetectionFieldLatency>>1) + 1 );
}

// get the current phase from the redundancy signal oldPhase = curPhase;
GetFilmInfo(&FM,&F5);
curPhase = GetActualPhase(fCurrentFieldCount & 1,F5,FM);

// do we have a phase change?

switch(curPhase)
{
    case PHASE_UNKNOWN:
        break;

case PHASE_VIDEO:
        if((oldPhase >= 0) && (oldPhase <= 4))
        {
            // we just went out of film mode, so let's remember this change time

*(ulong *)&fChangeTimecode = *(ulong *)&fCurTimecode;
            bJustDetectedVideo = true;
        }
        break;

default:         // curPhase = 2 or 4
        if(p==0)     // first phase change is actually just the phase at the In-point
        {
            gPhaseChange[p].time = fChangeTimecode;
            gPhaseChange[p].phase = ConvertPhaseUsingTimecodes(fCurTimecode,
                                                               curPhase,
                                                               fChangeTimecode);
            if(p < PHASECHANGEMAX-1)
                p++;
        }
```

APPENDIX A, p. 5 of 9

```
            else
            {
                if(bJustDetectedVideo)
                {
                    // we're back in film mode, so we just had a phase change char ph1,ph2;

bJustDetectedVideo = false;

ph1 = ConvertPhaseUsingTimecodes(fCurTimecode,curPhase,fChangeTimecode);
                    ph2 = ConvertPhaseUsingTimecodes(gPhaseChange[p-1].time,
                                                    gPhaseChange[p-1].phase,
                                                    fChangeTimecode);
                    ph2 = (ph2 + 4) % 5;

// add new phase change only if it's not redundant if(ph1 != ((ph2 + 1) % 5))
                    {
                        gPhaseChange[p].time = fChangeTimecode;
                        gPhaseChange[p].phase = ph1;
                        if(p < PHASECHANGEMAX-1)
                            p++;
                    }
                }
            }
            break;
    }
}
/*
Routine:     GetActualPhase()
Purpose:     determine the phase of the current video frame
Execution:   called once every field, by DoPhaseDetect()
Inputs:      bField2, bFM, bF5
Outputs:     phase
Description: returns 2,4,PHASE_UNKNOWN or PHASE_VIDEO
*/ static char GetActualPhase(Boolean bField2,Boolean bF5,Boolean bFM)
{
    char phase;

if(bFM)
    {
        if(bF5)
        {
            // phases 2 and 4 are the only ones we can be sure about if(bField2)
                phase = 4;
            else
                phase = 2;
        }
        else
            phase = PHASE_UNKNOWN;
    }
    else
        phase = PHASE_VIDEO;

return phase;
}
```

APPENDIX A, p.6 of 9

SECTION 3: STEP D: PHASE CHANGE LIST -> SYNCED PHASE CHANGE LIST

```
/*
StepD()
{
    NormalizePhaseChange();
}
*/

/*
Routine:    NormalizePhaseChange()
Purpose:    add DROP and KEEP actions to a phase change list for A/V sync
Execution:  called once
Inputs:
Outputs:
Description:
*/ void NormalizePhaseChange( void )
{
    short pf;
    ulong F0,F1;
    long FrameMod;
    char tph;

pf = 0;

// let's go through the array, inserting DROP or KEEP as we go while(gPhaseChange[pf].phase != PHASE_UNKNOWN)
    {
        // calculate FrameMod, the position of the phase change within its group of 5 timecode_to_frames( &gPhaseChange[0].time, &F0 );
        timecode_to_frames( &gPhaseChange[pf].time, &F1 );
        FrameMod = (F1 - F0) % 5;

// only proceed if FrameMod is not 0 if(FrameMod)
        {
            // determine theoretical phase before disruption tph = ConvertPhaseUsingTimecodes(gPhaseChange[pf-1].time,
                                            gPhaseChange[pf-1].phase,
                                            gPhaseChange[pf].time);
            tph = (tph + 4) % 5;

// fill in groupPhasePtr[5] with the 5 phases
            {
                short i;
                char groupPhasePtr[5];
                timecode groupTime = gPhaseChange[pf].time;
                char f,t,p;

f = tph;
                t = gPhaseChange[pf].phase;
                p = FrameMod;
```

*Appendix A, p. 7 of 9*

```
                // fill in phases before disruption groupPhasePtr[0] = ConvertPhaseUsingFrames((p + 4) % 5,f,0);
                for(i=1;i<p;i++)
                    groupPhasePtr[i] = (groupPhasePtr[0] + i) % 5;

// fill in phases after disruption groupPhasePtr[p] = t;
                for(i=p+1;i<5;i++)
                    groupPhasePtr[i] = (groupPhasePtr[p] + i - p) % 5;

// exercise the rules sub_frames(groupTime,FrameMod);
                InsertAction(groupTime,groupPhasePtr);
            }
        } pf++;
    }

}
```

APPENDIX A, p. 8 of 9

```
/*
Routine:    InsertAction()
Purpose:    determine if DROP or KEEP actions need to be inserted for A/V sync
Execution:  called by NormalizePhaseChange()
Inputs:     groupTime,groupPhasePtr
Outputs:
Description:
*/ void InsertAction(timecode groupTime,char *groupPhasePtr)
{
    short i;
    char frameToDrop = -1;
    char numberPhase2 = 0;
    timecode actionTime = groupTime;

// since the default is to drop phase 2's, let's count the phase 2's in the group for(i=0;i<5;i++)
    {
        if(groupPhasePtr[i] == 2)
            numberPhase2++;
    }

// the rules are based on the number of phase 2's in the group switch(numberPhase2)
    {
        case 0:                                             // drop frame after disruption
            for(i=1;(i<5) && (frameToDrop>=0);i++)
            {
                if(groupPhasePtr[i] != ((groupPhasePtr[i-1] + 1) % 5))    // disruption
                    frameToDrop = i;
            }
            add_frames(actionTime ,frameToDrop);
            InsertPhaseChange(ACTION_DROP,actionTime );
            break;

case 1:                                             // do nothing
            break;

default:                                            // keep all but the last phase 2
            for(i=4;(i>=0) && (frameToDrop>=0);i--)
            {
                if(groupPhasePtr[i] == 2)
                    frameToDrop = i;
            }
            for(i=actionFrame-1;i>=0;i--)
            {
                if(groupPhasePtr[i] == 2)
                {
                    add_frames(actionTime ,i);
                    InsertPhaseChange(ACTION_KEEP,actionTime );
                }
            }
            break;
    }
}
```

*APPENDIX A, p. 9 of 9*

SECTION 4: UTILITY ROUTINES

```
timecode sVTR_POLL(void);                                              // gets current timecode
void add_frames(timecode *t,long frames);                              // adds frames to t
void sub_frames(timecode *t,long frames);                              // subtracts frames from t
void GetFilmInfo(Boolean *FM,Boolean *F5);                             // gets current FM and F5
char ConvertPhaseUsingTimecodes(timecode rt,char rPhase,timecode t);   // determines phase at t
char ConvertPhaseUsingFrames(timecode rF,char rPhase,timecode F);      // determines phase at t
void timecode_to_frames(timecode *t,long *F);                          // converts t to F
```

We claim:

1. An apparatus for performing an inverse telecine process on a video sequence, comprising:
   a phase detector providing (a) a first control signal, having an asserted state and a negated state, indicating that a telecine pattern is detected in the video sequence, and (b) a second control signal, having an asserted state and a negated state, indicating a phase value of a redundant field, relative to a preselected position of a repeated sequence in said telecine pattern, in said detected telecine pattern;
   first and second registers for storing values of said first and second control signals sampled at regular time intervals; and
   a central processing unit, having access to said first and second registers, said central processing unit, at said regular time intervals, (i) examining said sampled values of said first and second control signals, (ii) determining if a disruption in said telecine pattern has occurred, (iii) determining whether a shift in phase value has occurred; (iv) determining, at said shift in phase value, a shifted phase value; and (v) including said video field in a list said central processing unit further (i) grouping said video sequence into groups of consecutive fields, each group including a predetermined number of fields, and (ii) marking in each of said groups, a predetermined number of fields for deletion.

2. An apparatus as in claim 1, wherein said apparatus further comprises:
   a control circuit for removing from encoding said video sequence said select video fields marked for deletion; and
   an encoder, receiving said video sequence, after said selected video fields are removed from encoding, for performing a data compression of said video sequence.

3. An apparatus as in claim 1, wherein said marking step selects a field for deletion according to the rules:
   (a) if a redundant field is detected in a group, said redundant field is marked for deletion; and
   (b) if a shift in phase value is detected in said group, and no redundant field is detected, the field at which said shift in phase value occurs is marked for deletion.

4. An apparatus as in claim 1, wherein said marking step selects a field for deletion according to the rules:
   (a) if a redundant field is detected in a group, said redundant field is marked for deletion; and
   (b) if a shift in phase value is detected in said group, and no redundant field is detected, the field preceding said shift in phase value occurs is marked for deletion.

5. An apparatus as in claim 3, wherein said marking step selects a field for deletion according to the further rule that, when multiple redundant fields are detected in said group, the redundant field arriving latest in time is marked deleted.

6. An apparatus as in claim 4, wherein said marking step selects a field for deletion according to the further rule that, when multiple redundant fields are detected in said group, the redundant field arriving latest in time is marked deleted.

7. A method for performing an inverse telecine process on a video sequence, comprising the steps of:
   providing, from a phase detector, (a) a first control signal, having an asserted state and a negated state, indicating that a telecine pattern is detected in the video sequence, and (b) a second control signal, having an asserted state and a negated state, indicating a phase value of a redundant field, relative to a preselected position of a repeated sequence in said telecine pattern, in said detected telecine pattern;
   sampling at regular time intervals values of said first and second control signals;
   at said regular time intervals, (i) examining said sampled values of said first and second control signals, (ii) determining if a disruption in said telecine pattern has occurred; (iii) determining whether a shift in phase value has occurred; (iv) determining, at said shift in phase value, a shifted phase value; and (v) including said video field in a list.

8. A method as in claim 7, further comprises the steps of:
   removing from encoding said video sequence said select video fields marked for deletion;
   receiving said video sequence, after said selected video fields are removed from; and
   performing a data compression procedure on said video sequence.

9. A method as in claim 7, wherein said marking step selects a field for deletion according to the rules:
   (a) if a redundant field is detected in a group, said redundant field is marked for deletion; and
   (b) if a shift in phase value is detected in said group, and no redundant field is detected, the field at which said shift in phase value occurs is marked for deletion.

10. A method as in claim 7, wherein said marking step selects a field for deletion according to the rules:
    (a) if a redundant field is detected in a group, said redundant field is marked for deletion; and
    (b) if a shift in phase value is detected in said group, and no redundant field is detected, the field preceding said shift in phase value occurs is marked for deletion.

11. A method as in claim 9, wherein said marking step selects a field for deletion according to the further rule that, when multiple redundant fields are detected in said group, the redundant field arriving latest in time is marked deleted.

12. A method as in claim 10, wherein said marking step selects a field for deletion according to the further rule that, when multiple redundant fields are detected in said group, the redundant field arriving latest in time is marked deleted.

* * * * *